(12) United States Patent
Du et al.

(10) Patent No.: US 11,987,907 B2
(45) Date of Patent: May 21, 2024

(54) MOLYBDENUM DISULFIDE/GRAPHENE/CARBON COMPOSITE MATERIAL AND USE THEREOF

(71) Applicant: QINGDAO UNIVERSITY, Qingdao (CN)

(72) Inventors: Hui Du, Qingdao (CN); Yajing Duan, Qingdao (CN); Zhaojun Chen, Qingdao (CN); Hui Fu, Qingdao (CN); Jinzhe Fu, Qingdao (CN)

(73) Assignee: QINGDAO UNIVERSITY, Qingdao (CN)

( * ) Notice: Subject to any disclaimer, the term of this patent is extended or adjusted under 35 U.S.C. 154(b) by 0 days.

(21) Appl. No.: 17/638,208

(22) PCT Filed: Mar. 3, 2020

(86) PCT No.: PCT/CN2020/077517
§ 371 (c)(1),
(2) Date: Feb. 25, 2022

(87) PCT Pub. No.: WO2021/036219
PCT Pub. Date: Mar. 4, 2021

(65) Prior Publication Data
US 2022/0243366 A1   Aug. 4, 2022

(30) Foreign Application Priority Data
Aug. 28, 2019   (CN) .......................... 201910804766.8

(51) Int. Cl.
*D01F 9/22*   (2006.01)
*D01D 5/00*   (2006.01)

(52) U.S. Cl.
CPC ............. *D01F 9/22* (2013.01); *D01D 5/0007* (2013.01); *D10B 2101/12* (2013.01); *Y10T 428/2918* (2015.01); *Y10T 428/298* (2015.01)

(58) Field of Classification Search
CPC .... D01F 9/22; D01D 5/0007; D10B 2101/12; Y10T 428/2918; Y10T 428/298
(Continued)

(56) References Cited

U.S. PATENT DOCUMENTS

| 2016/0181596 A1 | 6/2016 | Singh et al. |
| 2019/0103231 A1 | 4/2019 | Chai et al. |

FOREIGN PATENT DOCUMENTS

| CN | 102142538 A | 8/2011 |
| CN | 104835964 A | 8/2015 |

(Continued)

OTHER PUBLICATIONS

Bo Chen, et al., Preparation of graphene-MoS2 hybrid aerogels as multifunctional sorbents for water remediation, Science China Materials, 2017, pp. 1102-1108, vol. 60, No. 11.
(Continued)

*Primary Examiner* — Jennifer A Boyd
*Assistant Examiner* — Ricardo E Lopez
(74) *Attorney, Agent, or Firm* — Bayramoglu Law Offices LLC

(57) ABSTRACT

A molybdenum disulfide/graphene/carbon composite material having a hierarchical pore structure includes a composite nanofiber having a diameter of 60 to 500 nm. The composite nanofiber comprises, in mass percentage, 3% to 35% of molybdenum disulfide, 0.2% to 10% of graphene, and 60% to 95% of carbon. The composite nanofiber has a hierarchical pore structure distributed along the axial direction, and has a pore diameter continuously distributed between 0.1 nm and 5 μm and an average pore diameter between 1.5 nm and
(Continued)

25 nm. On the basis of the pore volume, in the hierarchical pore structure, a micropore structure accounts for 25% to 60%, and a mesoporous structure accounts for 40% to 75%. The microporous structure is distributed on the surface of the nanofiber and the pore wall of the mesoporous structure.

4 Claims, 3 Drawing Sheets

(58) Field of Classification Search
USPC .......................................................... 428/367
See application file for complete search history.

(56) References Cited

FOREIGN PATENT DOCUMENTS

| CN | 104966812 | A | | 10/2015 |
|---|---|---|---|---|
| CN | 105304876 | A | | 2/2016 |
| CN | 105463831 | A | * | 4/2016 |
| CN | 105463831 | A | | 4/2016 |
| CN | 107230552 | A | | 10/2017 |
| CN | 107958791 | A | | 4/2018 |
| CN | 105304876 | B | * | 6/2018 |
| CN | 108172420 | A | | 6/2018 |
| CN | 108199018 | A | | 6/2018 |
| CN | 110492083 | A | | 11/2019 |
| CN | 110504431 | A | | 11/2019 |
| IN | 107799314 | A | | 3/2018 |

OTHER PUBLICATIONS

Gengzhi Sun, et al., Hybrid Fibers Made of Molybdenum Disulfide, Reduced Graphene Oxide, and Multi-Walled Carbon Nanotubes for Solid-State, Flexible, Asymmetric Supercapacitors**, Angewandte Chemie International Edition, 2015, pp. 4651-4656, vol. 54.

* cited by examiner

MOLYBDENUM DISULFIDE/GRAPHENE/CARBON COMPOSITE MATERIAL AND USE THEREOF

CROSS REFERENCE TO THE RELATED APPLICATION

This application is the national phase entry of International Application No. PCT/CN2020/077517, filed on Mar. 3, 2020, which is based upon and claims priority to Chinese Patent Application No. 201910804766.8, filed on Aug. 28, 2019, the entire contents of which are incorporated herein by reference.

TECHNICAL FIELD

The present disclosure belongs to the field of carbon composite materials, and in particular relates to a molybdenum disulfide/graphene/carbon composite material with a hierarchical pore structure, and use thereof.

BACKGROUND

Porous carbon materials are widely used in fields such as catalyst supports, supercapacitors, catalysts, adsorbents, and gas storage due to their high specific surface area (SSA), high porosity, prominent electrical and thermal conductivity, and adjustable pore diameter and surface properties. Since the discovery of monolayer graphene in 2004, various two-dimensional (2D) materials represented by monolayer graphene have received extensive attention from researchers due to a wide variety of physical and chemical properties and a promising application prospect in fields such as electronic devices, photoelectric devices, catalysis, energy, and environment. Monolayer molybdenum disulfide is a transition metal layered compound with a similar structure to graphene, which was originally used as a solid lubricant and a hydrogenation catalyst. With the deepening of people's understanding for molybdenum disulfide 2D materials, a series of unique physical and chemical properties thereof have been gradually discovered, which shows a promising application prospect in fields such as microelectronics, sensing, energy, and environment. However, pure molybdenum disulfide is prone to agglomeration, and thus active sites thereof cannot be fully exposed, which seriously affects the catalytic properties and the cycling stability of energy storage. Therefore, it is of great significance for effectively compounding molybdenum disulfide with a carbon nanomaterial with excellent stability.

Chinese patent 201711384891.5 discloses a foamed graphene/carbon nanotube (CNT)/molybdenum disulfide composite material with a tertiary structure, a structure of which is characterized by including a three-dimensional (3D) foamed graphene primary structure, a one-dimensional (1D) CNT secondary structure in-situ growing on the primary structure, and a 2D molybdenum disulfide tertiary structure coated on the secondary structure. The primary and secondary structures composed of carbon-based materials determine the high SSA of the composite material, and the tertiary structure composed of the non-carbon material molybdenum disulfide determines the high catalytic activity of the composite material. CNTs grow in-situ on the 3D foamed graphene primary structure, which ensures the integrity of the 3D skeleton structure. The 2D molybdenum disulfide tertiary structure covers the surface of the carbon material to protect the carbon material, which avoids the instability of the carbon material. Moreover, the molybdenum disulfide tertiary structure is only a few atoms thick, which overcomes defects of non-carbon materials such as large mass, high price, and poor electrical conductivity. However, the composite material simply has a fixed three-layer structure, which does not form a hierarchical pore structure.

Chinese patent 201510947452.5 discloses a molybdenum disulfide/graphene/carbon nanofiber (CNF) composite material, where a polyacrylonitrile (PAN) nanofiber film is prepared by electrostatic spinning, graphene oxide (GO) is coated on the PAN nanofiber film by a solution impregnation method, then the film is subjected to high-temperature carbonization to obtain a graphene/CNF composite film, and finally a molybdenum disulfide nanosheet is allowed to in-situ grow on the graphene/CNF film through a one-step hydrothermal process. The molybdenum disulfide/graphene/CNF composite material prepared in this patent is a composite carbon fiber film material. There is no internal pores in a fiber structure of the material, and the material has a small SSA and few active sites that can be exposed, which affects the application performance of the material.

Chinese patent 201510245973.6 provides a 3D macroporous graphene-CNT-molybdenum disulfide composite material, where a metal foam with a pore diameter of 0.1 mm to 5 mm is subjected to pretreatment and chemical vapor deposition (CVD) to obtain a 3D macroporous graphene/metal foam composite; the 3D macroporous graphene/metal foam composite is placed in an aqueous solution of nickel nitrate and cobalt chloride, dried, and subjected to CVD to obtain a 3D macroporous graphene/CNT/metal foam composite; the 3D macroporous graphene/CNT/metal foam composite is impregnated in an etching solution to obtain 3D macroporous graphene/CNTs, and molybdenum disulfide is loaded on the 3D macroporous graphene/CNTs through a hydrothermal process to obtain 3D macroporous graphene/CNTs loaded with molybdenum disulfide; and finally the 3D macroporous graphene/CNTs loaded with molybdenum disulfide is annealed to obtain the 3D macroporous graphene-CNT-molybdenum disulfide composite material. As a negative electrode active material for lithium-ion batteries (LIBs), the composite material has the advantages of high capacity and high stability, but the composite material includes a single pore structure and requires a complicated preparation process.

Chinese patent 201410711472.8 discloses a 3D porous molybdenum disulfide-loaded graphene composite material, which is composed of a 3D porous graphene network and a molybdenum disulfide nanosheet loaded on a surface of the 3D porous graphene network, where the 3D porous graphene network has a thickness of 1 nm to 20 nm and a radius of 1 nm to 15 nm. The composite material can be used as a negative electrode material for LIBs. The composite material mainly utilizes the 3D porous structure of graphene, and there is no hierarchical pore structure in the entire material structure.

SUMMARY

Technical Problem

Existing graphene/molybdenum disulfide-based carbon composite materials have a single pore structure that is not adjustable, most simply utilize the pore structure of graphene, and lack internal pore structures, which severely limits the application range and effect of the porous carbon materials. Moreover, only adjustable porous carbon materials can form structures with different pore diameters according to requirements, and thus can meet the requirements of applications in fields such as catalyst supports, supercapacitors, catalysts, adsorbents, and gas storage.

Technical Solutions

The present disclosure is intended to overcome the shortcomings in the prior art, and provide a molybdenum disulfide/graphene/carbon composite material with a hierarchical pore structure, and use thereof. The molybdenum disulfide/graphene/carbon composite material has advantages such as high SSA, well developed pore structure, controllable pore size and structure, and extensive application.

The present disclosure is implemented by the following technical solutions.

In an aspect of the present disclosure, a molybdenum disulfide/graphene/carbon composite material is provided, where the composite material is composed of a composite nanofiber with a diameter of 60 nm to 500 nm; in mass percentage, the composite nanofiber includes 3% to 35% of molybdenum disulfide, 0.2% to 10% of graphene, and 60% to 95% of carbon; and the composite nanofiber has a hierarchical pore structure distributed along an axial direction.

Preferably, in mass percentage, the composite nanofiber may include 6% to 33% of molybdenum disulfide, 0.6% to 7% of graphene, and 60% to 94% of carbon.

Optionally, the molybdenum disulfide and the graphene may both be uniformly dispersed as a monolayer structure in the composite nanofiber based on a CNF.

Optionally, the hierarchical pore structure may have a pore diameter continuously distributed between 0.1 nm and 5 μm, and an average pore diameter of 1.5 nm to 25 nm.

Optionally, based on a pore volume, in the hierarchical pore structure, a microporous structure may account for 25% to 60% and a mesoporous structure may account for 40% to 75%.

Optionally, the microporous structure may be distributed on a surface of the nanofiber and a pore wall of the mesoporous structure.

Optionally, the composite material may have an SSA of 500 $m^2/g$ to 3,200 $m^2/g$.

Preferably, the composite material may have an SSA of 600 $m^2/g$ to 3,152 $m^2/g$.

Further, the molybdenum disulfide/graphene/carbon composite material with a hierarchical pore structure according to the present disclosure is prepared by the following method:

(1) adding 0.6 g to 1.5 g of PAN, 0.5 g to 1.2 g of polyvinylpyrrolidone (PVP), 0.2 g to 1.0 g of ammonium tetrathiomolybdate (ATTM), and 0.05 g to 0.2 g of graphene to 10 g to 16 g of N,N-dimethylformamide (DMF), stirring for dissolution, and filtering a resulting solution through a 400-mesh stainless steel mesh to obtain a filtrate for later use;

(2) taking an appropriate amount of the filtrate to conduct electrostatic spinning at room temperature for 2 hours to 10 hours under the following parameters to obtain a composite fiber film: a spinning voltage of 20 kV, an advancing speed of 0.015 mL/min, a spinning receiving distance of 18 cm, and a syringe needle of 8 #;

(3) placing the composite fiber film in a tube furnace, and in a $N_2/H_2$ (with a volume ratio of 9/1) mixed atmosphere, heating to 380° C. to 450° C. at a heating rate of 2° C./min to 6° C./min, holding the temperature for 1 hour to 6 hours, cooling to room temperature, and taking a treated composite fiber film out;

(4) preparing a KOH saturated solution, subjecting the treated composite fiber film to ultrasonic treatment in the KOH saturated solution for 1 hour and static impregnation for 48 hours in the KOH saturated solution, and vacuum-drying the film for 8 hours, where a mass ratio of the treated composite fiber film to KOH is 1:(0.4-10); and (5) placing the composite fiber film impregnated above in a tube furnace, and in an argon atmosphere, heating to 750° C. to 850° C. at a heating rate of 2° C./min to 10° C./min to conduct high-temperature activation for 1 hour to 16 hours, cooling to room temperature, and taking a product out; and washing the product with a dilute hydrochloric acid solution, and vacuum-drying for 10 hours to obtain the molybdenum disulfide/graphene/carbon composite fiber material with a hierarchical pore structure.

In another aspect of the present disclosure, a preparation method of the molybdenum disulfide/graphene/carbon composite material is provided.

In the present disclosure, a PAN/PVP/ATTM/graphene composite fiber film is first prepared by electrostatic spinning, and then subjected to a high-temperature treatment at 380° C. to 450° C., such that a large number of mesoporous structures are formed in the axial direction of the fiber, and ATTM is decomposed into monolayer molybdenum disulfide at a high temperature and dispersed in the fiber, where a size of the mesoporous structure in the composite fiber can be adjusted by controlling a ratio of PAN to PVP; a composite fiber film obtained after the high-temperature treatment is subjected to ultrasonic impregnation and static impregnation in a KOH saturated solution, such that KOH is impregnated on a surface of the composite fiber film and into the mesoporous structure of the fiber; then high-temperature activation is conducted, such that a large number of microporous structures are further formed on a surface of the fiber and a pore wall of the mesoporous structure, where a size of the microporous structure in the composite fiber is adjusted by controlling an amount of KOH and conditions of the high-temperature activation; and a product is cleaned and dried to finally obtain the molybdenum disulfide/graphene/carbon composite material with a hierarchical pore structure. With the preparation method of the present disclosure, a ratio of the mesoporous structure to the microporous structure in the hierarchical pore structure can be flexibly adjusted.

Beneficial Effects

Compared with the prior art, the technical solutions of the present disclosure have the following advantages:

The molybdenum disulfide/graphene/carbon composite material with a hierarchical pore structure provided in the present disclosure has well developed pore structure, controllable pore size and structure, high SSA, uniform structure, excellent morphology, simple preparation process, and promising application prospect, which can be widely used in fields such as catalysis, environment, and energy.

Figure 1:
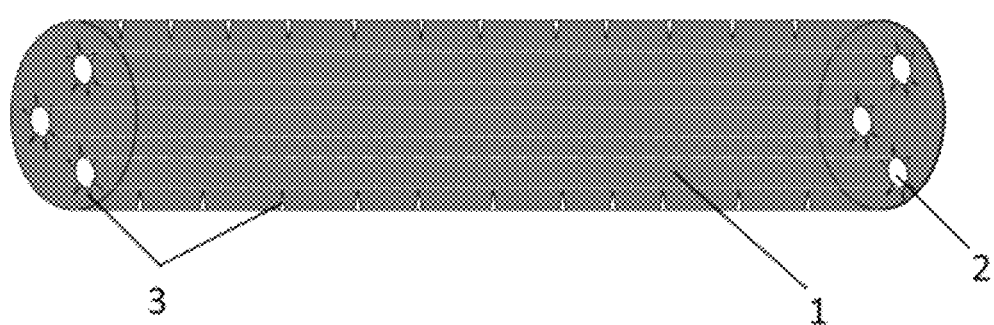
FIG. 1 is a schematic view of a structure of the molybdenum disulfide/graphene/carbon composite nanofiber with a hierarchical pore structure, where 1 represents a composite nanofiber, 2 represents a mesoporous structure, and 3 represents a microporous structure.
Figure 2:
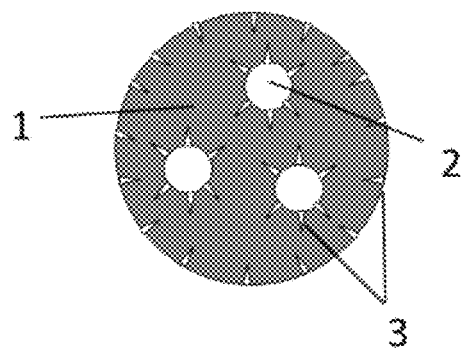
FIG. 2 is a schematic cross-sectional view of a structure of the molybdenum disulfide/graphene/carbon composite nanofiber with a hierarchical pore structure, where 1 represents a composite nanofiber, 2 represents a mesoporous structure, and 3 represents a microporous structure.

DESCRIPTION OF THE EMBODIMENTS 0.6 g of PAN, 0.5 g of PVP, 0.3 g of ATTM, and 0.05 g of graphene are added to 12 g of DMF, and a resulting mixture is stirred for dissolution and then filtered through a 400-mesh stainless steel mesh to obtain a filtrate for later use; an appropriate amount of the filtrate is taken to conduct electrostatic spinning at room temperature for 4 hours under the following parameters to obtain a composite fiber film: a spinning voltage of 20 kV, an advancing speed of 0.015 mL/min, a spinning receiving distance of 18 cm, and a syringe needle of 8 #; the composite fiber film is placed in a tube furnace, and in a $N_2/H_2$ (with a volume ratio of 9/1) mixed atmosphere, the composite fiber film is heated to 400° C. at a heating rate of 2° C./min, kept at the temperature for 4 hours, cooled to room temperature, and taken out; a KOH saturated solution is prepared, and the treated composite fiber film is subjected to ultrasonic treatment in the KOH saturated solution for 1 hour and static impregnation for 48 hours in the KOH saturated solution, and then vacuum-dried for 8 hours, where a mass ratio of the treated composite fiber film to KOH is 1:5; and the composite fiber film impregnated above is placed in a tube furnace, and in an argon atmosphere, the composite fiber film is heated to 750° C. at a heating rate of 2° C./min to undergo high-temperature activation for 2 hours, cooled to room temperature, taken out, washed with a dilute hydrochloric acid solution, and vacuum-dried for 10 hours to obtain a molybdenum disulfide/graphene/carbon composite material with a hierarchical pore structure. The product is composed of a composite nanofiber with a diameter of 80 nm to 300 nm; in mass percentage, the product includes 6% of molybdenum disulfide, 0.6% of graphene, and 93.4% of carbon; the product has an SSA of 600 $m^2/g$, a pore diameter continuously distributed between 0.1 nm and 5 μm, and an average pore diameter of 1.6 nm; and in a pore structure of the product, a microporous structure accounts for 58% and a mesoporous structure accounts for 42%. The product can be used in LIB negative electrode materials, supercapacitor electrode materials, and catalytic materials for hydrogen production by water electrolysis.

EXAMPLES OF THE PRESENT DISCLOSURE

The embodiments of the present disclosure will be described in detail below with reference to examples. If no specific conditions are specified in the examples, conventional conditions or conditions recommended by a manufacturer will be adopted. All of the reagents or instruments used are conventional commercially available products.

Example 1

0.6 g of PAN, 0.5 g of PVP, 0.3 g of ATTM, and 0.05 g of graphene were added to 12 g of DMF, and a resulting mixture is stirred for dissolution and then filtered through a 400-mesh stainless steel mesh to obtain a filtrate for later use; an appropriate amount of the filtrate was taken to conduct electrostatic spinning at room temperature for 4 hours under the following parameters to obtain a composite fiber film: a spinning voltage of 20 kV, an advancing speed of 0.015 mL/min, a spinning receiving distance of 18 cm, and a syringe needle of 8 #; the composite fiber film was placed in a tube furnace, and in a $N_2/H_2$ (with a volume ratio of 9/1) mixed atmosphere, the composite fiber film was heated to 400° C. at a heating rate of 2° C./min, kept at the temperature for 4 hours, cooled to room temperature, and taken out; a KOH saturated solution was prepared, and the treated composite fiber film was subjected to ultrasonic treatment in the KOH saturated solution for 1 hour and static impregnation for 48 hours in the KOH saturated solution, and then vacuum-dried for 8 hours, where a mass ratio of the treated composite fiber film to KOH is 1:5; and the composite fiber film impregnated above was placed in a tube furnace, and in an argon atmosphere, the composite fiber film was heated to 750° C. at a heating rate of 2° C./min to undergo high-temperature activation for 2 hours, cooled to room temperature, taken out, washed with a dilute hydrochloric acid solution, and vacuum-dried for 10 hours to obtain a molybdenum disulfide/graphene/carbon composite material with a hierarchical pore structure. The product is composed of a composite nanofiber with a diameter of 80 nm to 300 nm; in mass percentage, the product includes 6% of molybdenum disulfide, 0.6% of graphene, and 93.4% of carbon; the product has an SSA of 600 $m^2/g$, a pore diameter continuously distributed between 0.1 nm and 5 μm, and an average pore diameter of 1.6 nm; and in a pore structure of the product, a microporous structure accounts for 58% and a mesoporous structure accounts for 42%. The product can be used in LIB negative electrode materials, supercapacitor electrode materials, and catalytic materials for hydrogen production by water electrolysis.

Example 2

1.5 g of PAN, 1.0 g of PVP, 0.8 g of ATTM, and 0.2 g of graphene were added to 16 g of DMF, and a resulting mixture was stirred for dissolution and then filtered through a 400-mesh stainless steel mesh to obtain a filtrate for later use; an appropriate amount of the filtrate was taken to conduct electrostatic spinning at room temperature for 2 hours under the following parameters to obtain a composite fiber film: a spinning voltage of 20 kV, an advancing speed of 0.015 mL/min, a spinning receiving distance of 18 cm, and a syringe needle of 8 #; the composite fiber film was placed in a tube furnace, and in a $N_2/H_2$ (with a volume ratio of 9/1) mixed atmosphere, the composite fiber film was heated to 450° C. at a heating rate of 6° C./min, kept at the temperature for 1 hour, cooled to room temperature, and taken out; a KOH saturated solution was prepared, and the treated composite fiber film was subjected to ultrasonic treatment in the KOH saturated solution for 1 hour and static impregnation for 48 hours in the KOH saturated solution, and then vacuum-dried for 8 hours, where a mass ratio of the treated composite fiber film to KOH was 1:0.5; and the composite fiber film impregnated above was placed in a tube furnace, and in an argon atmosphere, the composite fiber film was heated to 850° C. at a heating rate of 8° C./min to undergo high-temperature activation for 15 hours, cooled to room temperature, taken out, washed with a dilute hydrochloric acid solution, and vacuum-dried for 10 hours to obtain a molybdenum disulfide/graphene/carbon composite material with a hierarchical pore structure. The product is composed of a composite nanofiber with a diameter of 60 nm to 420 nm; in mass percentage, the product includes 33% of molybdenum disulfide, 7% of graphene, and 60% of carbon; the product has an SSA of 2522 $m^2/g$, a pore diameter continuously distributed between 0.1 nm and 5 μm, and an average pore diameter of 12.6 nm; and in a pore structure of the product, a microporous structure accounts for 37% and a mesoporous structure accounts for 63%. The product can be used in mercury adsorption materials.

Figure 3:
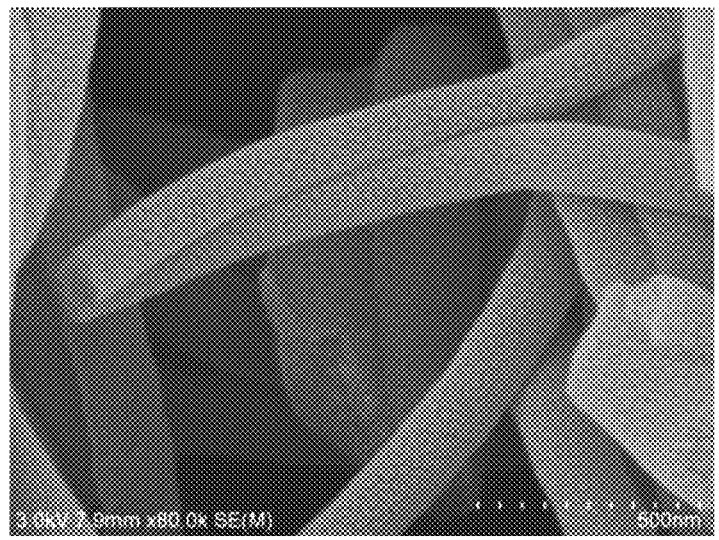
FIG. 3 is a scanning electron microscopy (SEM) image of the molybdenum disulfide/graphene/carbon composite material with a hierarchical pore structure prepared in Example 2.
Figure 4:
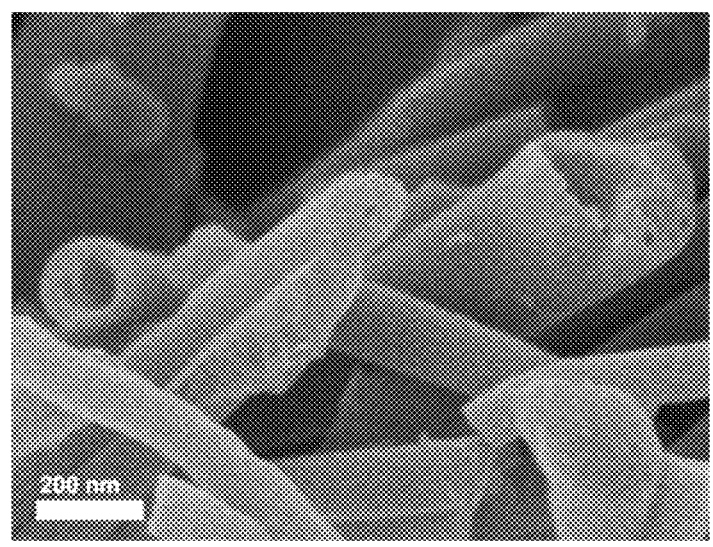
FIG. 4 is an SEM image of a fiber cross-section in the molybdenum disulfide/graphene/carbon composite material with a hierarchical pore structure prepared in Example 2.
Figure 5:
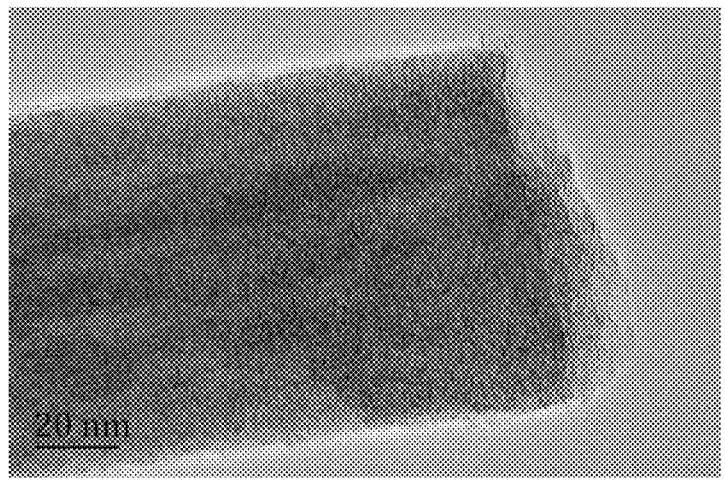
FIG. 5 is a transmission electron microscopy (TEM) image of the molybdenum disulfide/graphene/carbon composite material with a hierarchical pore structure prepared in Example 2.

FIG. 3 and FIG. 4 are SEM images of the molybdenum disulfide/graphene/carbon composite material prepared in this example, and it can be seen that mesoporous structures with different sizes are distributed in an axial direction in the fiber, and a large number of microporous structures are distributed on a surface of the fiber and a pore wall of the mesoporous structure. FIG. 5 is a TEM image of the molybdenum disulfide/graphene/carbon composite material prepared in this example, and it can be seen that molybdenum disulfide and graphene are highly uniformly dispersed as a monolayer structure in the composite fiber.

Example 3

1.0 g of PAN, 1.2 g of PVP, 1.0 g of ATTM, and 0.1 g of graphene were added to 10 g of DMF, and a resulting mixture was stirred for dissolution and then filtered through a 400-mesh stainless steel mesh to obtain a filtrate for later use; an appropriate amount of the filtrate was taken to conduct electrostatic spinning at room temperature for 10 hours under the following parameters to obtain a composite fiber film: a spinning voltage of 20 kV, an advancing speed of 0.015 mL/min, a spinning receiving distance of 18 cm, and a syringe needle of 8 #; the composite fiber film was placed in a tube furnace, and in a $N_2/H_2$ (with a volume ratio of 9/1) mixed atmosphere, the composite fiber film was heated to 380° C. at a heating rate of 4° C./min, kept at the temperature for 6 hours, cooled to room temperature, and taken out; a KOH saturated solution was prepared, and the treated composite fiber film was subjected to ultrasonic treatment in the KOH saturated solution for 1 hour and static impregnation for 48 hours in the KOH saturated solution, and then vacuum-dried for 8 hours, where a mass ratio of the treated composite fiber film to KOH was 1:10; and the composite fiber film impregnated above was placed in a tube furnace, and in an argon atmosphere, the composite fiber film was heated to 800° C. at a heating rate of 10° C./min to undergo high-temperature activation for 1 hour, cooled to room temperature, taken out, washed with a dilute hydrochloric acid solution, and vacuum-dried for 10 hours to obtain a molybdenum disulfide/graphene/carbon composite material with a hierarchical pore structure. The product is composed of a composite nanofiber with a diameter of 150 nm to 500 nm; in mass percentage, the product includes 14% of molybdenum disulfide, 6.2% of graphene, and 79.8% of carbon; the product has an SSA of 3152 $m^2/g$, a pore diameter continuously distributed between 0.1 nm and 5 μm, and an average pore diameter of 23.6 nm; and in a pore structure of the product, a microporous structure accounts for 25.8% and a mesoporous structure accounts for 74.2%. The product can be used in mercury adsorption materials.

Example 4

1.3 g of PAN, 0.6 g of PVP, 0.4 g of ATTM, and 0.15 g of graphene were added to 10 g of DMF, and a resulting mixture was stirred for dissolution and then filtered through a 400-mesh stainless steel mesh to obtain a filtrate for later use; an appropriate amount of the filtrate was taken to conduct electrostatic spinning at room temperature for 8 hours under the following parameters to obtain a composite fiber film: a spinning voltage of 20 kV, an advancing speed of 0.015 mL/min, a spinning receiving distance of 18 cm, and a syringe needle of 8 #; the composite fiber film was placed in a tube furnace, and in a $N_2/H_2$ (with a volume ratio of 9/1) mixed atmosphere, the composite fiber film was heated to 425° C. at a heating rate of 3° C./min, kept at the temperature for 5 hours, cooled to room temperature, and taken out; a KOH saturated solution was prepared, and the treated composite fiber film was subjected to ultrasonic treatment in the KOH saturated solution for 1 hour and static impregnation for 48 hours in the KOH saturated solution, and then vacuum-dried for 8 hours, where a mass ratio of the treated composite fiber film to KOH was 1:6; and the composite fiber film impregnated above was placed in a tube furnace, and in an argon atmosphere, the composite fiber film was heated to 820° C. at a heating rate of 6° C./min to undergo high-temperature activation for 12 hours, cooled to room temperature, taken out, washed with a dilute hydrochloric acid solution, and vacuum-dried for 10 hours to obtain a molybdenum disulfide/graphene/carbon composite material with a hierarchical pore structure. The product is composed of a composite nanofiber with a diameter of 60 nm to 500 nm; in mass percentage, the product includes 9.5% of molybdenum disulfide, 1.9% of graphene, and 88.6% of carbon; the product has an SSA of 1855 $m^2/g$, a pore diameter continuously distributed between 0.1 nm and 5 μm, and an average pore diameter of 4.5 nm; and in a pore structure of the product, a microporous structure accounts for 43% and a mesoporous structure accounts for 57%. The product can be used in LIB negative electrode materials, supercapacitor electrode materials, and catalytic materials for hydrogen production by water electrolysis.

INDUSTRIAL APPLICABILITY

The molybdenum disulfide/graphene/carbon composite material prepared by the present disclosure can be widely used in fields such as LIB negative electrode materials, supercapacitor electrode materials, catalytic materials for hydrogen production by water electrolysis, and mercury adsorption materials. The molybdenum disulfide/graphene/carbon composite material where a microporous structure accounts for more than 40% in the hierarchical pore structure is conducive to the transport of small-volume ions such as lithium ions, potassium ions, and hydrogen ions, and is suitable for LIB negative electrode materials, supercapacitor electrode materials, and catalytic materials for hydrogen production by water electrolysis. The molybdenum disulfide/graphene/carbon composite material where a microporous structure accounts for less than 40% in the hierarchical pore structure is suitable for mercury adsorption materials, because a large number of mesoporous structures are conducive to the diffusion of mercury ions.

What is claimed is:

1. A molybdenum disulfide/graphene/carbon composite material, wherein the molybdenum disulfide/graphene/carbon composite material is composed of a composite nanofiber with a diameter of 60 nm to 500 nm; in a mass percentage, the composite nanofiber comprises 3% to 35% of molybdenum disulfide, 0.2% to 10% of graphene, and 60% to 95% of carbon; and the composite nanofiber has a hierarchical pore structure distributed along an axial direction, wherein based on a pore volume, in the hierarchical pore structure, a microporous structure accounts for 25% to 60% and a mesoporous structure accounts for 40% to 75%,
  wherein the molybdenum disulfide and the graphene both are each uniformly dispersed as monolayer structures in the composite nanofiber based on a carbon nanofiber,
  wherein the molybdenum disulfide/graphene/carbon composite material has a specific surface area of 500 $m^2$/g to 3,200 $m^2$/g,
  wherein the hierarchical pore structure has a pore diameter continuously distributed between 0.1 nm and 5 μm, and an average pore diameter of the hierarchical pore structure is 1.5 nm to 25 nm,
  wherein the microporous structure is distributed on a surface of the composite nanofiber and a pore wall of the mesoporous structure, and
  wherein the composite material is prepared by the following method:
  (1) adding 0.6 g to 1.5 g of polyacrylonitrile, 0.5 g to 1.2 g of polyvinylpyrrolidone, 0.2 g to 1.0 g of ammonium tetrathiomolybdate, and 0.05 g to 0.2 g of graphene to 10 g to 16 g of N,N-dimethylformamide, stirring a resulting solution for dissolution, and filtering the resulting solution through a 400-mesh stainless steel mesh to obtain a filtrate;
  (2) conducting an electrostatic spinning of said filtrate to obtain a composite fiber film;
  (3) placing the composite fiber film in a tube furnace, and in a $N_2/H_2$ mixed atmosphere with a volume ratio of 9/1, heating the tube furnace to a temperature of 380° C. to 450° C. at a heating rate of 2° C./min to 6° C./min, holding the temperature for 1 hour to 6 hours, cooling the tube furnace to room temperature, and taking a treated composite fiber film out of the tube furnace;
  (4) preparing a KOH saturated solution, subjecting the treated composite fiber film to an ultrasonic treatment in the KOH saturated solution for 1 hour and a static impregnation for 48 hours in the KOH saturated solution, and vacuum-drying an impregnated composite fiber film for 8 hours to obtain a dried composite fiber film, wherein a mass ratio of the treated composite fiber film to KOH is 1:(0.4-10); and
  (5) placing the dried composite fiber film in the tube furnace, and in an argon atmosphere, heating the tube furnace to 750° C. to 850° C. at a heating rate of 2° C./min to 10° C./min to conduct a high-temperature activation for 1 hour to 16 hours, cooling the tube furnace to room temperature, and taking a product out; and washing the product with a dilute hydrochloric acid solution, and vacuum-drying a washed product for 10 hours to obtain the molybdenum disulfide/graphene/carbon composite material with the hierarchical pore structure.

2. A method for preparing the molybdenum disulfide/graphene/carbon composite material according to claim 1, comprising:
  (1) adding 0.6 g to 1.5 g of polyacrylonitrile, 0.5 g to 1.2 g of polyvinylpyrrolidone, 0.2 g to 1.0 g of ammonium tetrathiomolybdate, and 0.05 g to 0.2 g of graphene to 10 g to 16 g of N,N-dimethylformamide, stirring a resulting solution for dissolution, and filtering the resulting solution through a 400-mesh stainless steel mesh to obtain a filtrate;
  (2) conducting an electrostatic spinning of said filtrate to obtain a composite fiber film;
  (3) placing the composite fiber film in a tube furnace, and in a $N_2/H_2$ mixed atmosphere with a volume ratio of 9/1, heating the tube furnace to a temperature of 380° C. to 450° C. at a heating rate of 2° C./min to 6° C./min, holding the temperature for 1 hour to 6 hours, cooling the tube furnace to room temperature, and taking a treated composite fiber film out of the tube furnace;
  (4) preparing a KOH saturated solution, subjecting the treated composite fiber film to an ultrasonic treatment in the KOH saturated solution for 1 hour and a static impregnation for 48 hours in the KOH saturated solution, and vacuum-drying an impregnated composite fiber film for 8 hours to obtain a dried composite fiber film, wherein a mass ratio of the treated composite fiber film to KOH is 1:(0.4-10); and
  (5) placing the dried composite fiber film in the tube furnace, and in an argon atmosphere, heating the tube furnace to 750° C. to 850° C. at a heating rate of 2° C./min to 10° C./min to conduct a high-temperature activation for 1 hour to 16 hours, cooling the tube furnace to room temperature, and taking a product out; and washing the product with a dilute hydrochloric acid solution, and vacuum-drying a washed product for 10 hours to obtain the molybdenum disulfide/graphene/carbon composite material with the hierarchical pore structure.

3. The molybdenum disulfide/graphene/carbon composite material according to claim 2, wherein the electrostatic spinning in step (2) is conducted at room temperature for 2 hours to 10 hours under the following parameters to obtain the composite fiber film: a spinning voltage of 20 kV, an advancing speed of 0.015 mL/min, a spinning receiving distance of 18 cm, and a syringe needle of 8 #.

4. A lithium-ion battery negative electrode comprising the molybdenum disulfide/graphene/carbon composite material according to claim 1.

* * * * *